June 19, 1951 E. R. PRICE 2,557,795
TRANSMISSION CONTROL MECHANISM
Filed Oct. 10, 1947 7 Sheets-Sheet 1

INVENTOR.
EARL R. PRICE
BY
H. Q. Clayton
ATTORNEY

June 19, 1951     E. R. PRICE     2,557,795
TRANSMISSION CONTROL MECHANISM
Filed Oct. 10, 1947     7 Sheets-Sheet 2

INVENTOR.
EARL R. PRICE
BY H. O. Clayton
ATTORNEY

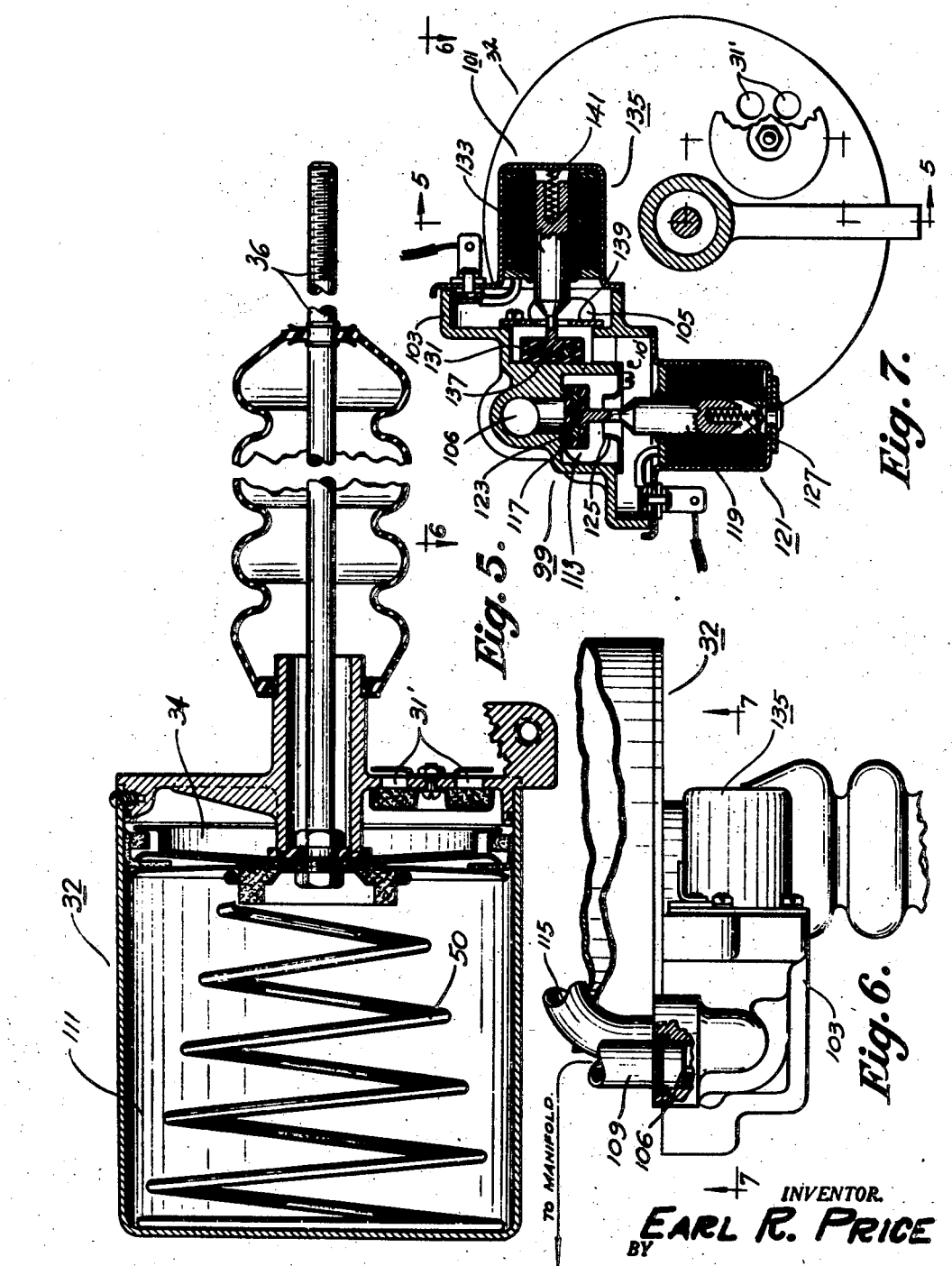

INVENTOR
EARL R. PRICE
BY H. Q. Clayton
ATTORNEY

June 19, 1951 E. R. PRICE 2,557,795
TRANSMISSION CONTROL MECHANISM
Filed Oct. 10, 1947 7 Sheets-Sheet 5

INVENTOR.
EARL R. PRICE
BY
H. O. Clayton
ATTORNEY

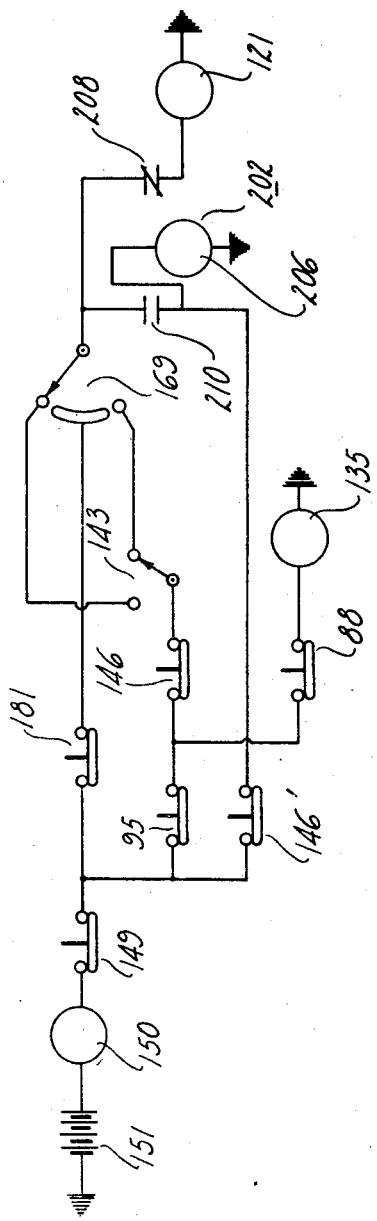

June 19, 1951     E. R. PRICE     2,557,795
TRANSMISSION CONTROL MECHANISM
Filed Oct. 10, 1947     7 Sheets-Sheet 7

INVENTOR.
EARL R. PRICE
BY
H. Q. Clayton
ATTORNEY

Patented June 19, 1951

2,557,795

UNITED STATES PATENT OFFICE 2,557,795

TRANSMISSION CONTROL MECHANISM

Earl R. Price, South Bend, Ind., assignor to Bendix Aviation Corporation, South Bend, Ind., a corporation of Delaware Application October 10, 1947, Serial No. 779,164

6 Claims. (Cl. 192—.073)

This invention relates in general to the power transmission mechanism of the power plant of an automotive vehicle and in particular to power and manually operated means for operating the change speed transmission of said power plant and for operating the throttle and the friction clutch to facilitate the operation of the transmission.

One of the objects of my invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission facilitated by an operation of the throttle and friction clutch, being effected by power means if the driver elects this operation of the mechanism.

A further object of my invention is to provide, in an automotive vehicle including a power plant comprising a fluid coupling, an accelerator, a friction clutch, an engine controlling throttle, a three speeds forward and reverse transmission, and a gear shift lever, means for operating and for facilitating the operation of said transmission, said means including power means, comprising a single acting motor, which is automatically operable, when the clutch pedal is in its clutch engaged position and the accelerator is released, to establish the transmission either in its second gear setting or its high gear setting depending upon the speed of the vehicle, the friction clutch and the throttle preferably being operated by said motor to facilitate this operation of the transmission, said means further including manually operated means for effecting, at any time, any one of the gear settings of the transmission.

A further object of my invention is to provide, in the power plant of an automotive vehicle, a manually and power operated mechanism for operating a three speeds forward and reverse transmission and a friction clutch, said mechanism being capable of a manual operation to operate the transmission and also capable, when the accelerator and clutch pedal are released, of effecting a power operation of the transmission to alternately effect the second and high gear settings thereof, the friction clutch being disengaged to facilitate each of said operations and automatically re-engaged after each operation is completed; and another object of my invention is to include, in such a mechanism, means for insuring a completion of the operation of the clutch and transmission once initiated and for insuring, by a recycle operation of the mechanism, the operation of the mechanism called for by a governor operated switch said switch constituting one of the principal controls of the mechanism.

Another object of my invention is to provide, in an automotive vehicle including a power plant comprising a fluid coupling, a friction clutch, a gear shift lever, an engine controlling throttle, a vehicle speed responsive governor and a change speed transmission, manually and power operated mechanism for operating the transmission to alternately effect two of its settings and for operating the throttle and clutch to facilitate said operation of the transmission, said mechanism including a single acting pressure differential operated motor operably connected to the transmission, clutch and throttle and operative, in one cycle of operations, to disengage the clutch, the throttle being held closed during said operation, then operate the transmission to establish one or the other of the aforementioned two settings, and lastly re-engage the clutch in a plurality of stages of operation; and the principal object of my invention is to include in said mechanism a simple electrical means operative, with certain operations of switches operated by the clutch pedal of the car, the governor, the transmission, the accelerator, and the motor, to initiate and complete the aforementioned cycle of operations of the motor.

Yet another object of my invention is to provide, in the power plant of an automotive vehicle including a change speed transmission and a clutch pedal, a mechanism for automatically effecting a power operation of the transmission when the clutch pedal is in its released position the clutch and throttle of the power plant being operated to facilitate the operation of the transmission; and a further object of my invention is to so construct said mechanism as to make possible a manual operation of the transmission at the will of the driver the power means being temporarily disabled to effect this operation.

The above and other objects and features of the invention will appear more fully hereinafter from a consideration of the following description taken in connection with the accompanying drawings wherein certain embodiments of the invention are illustrated by way of example.

Figure 5 is a sectional view, taken on the line 5—5 of Figure 7, disclosing details of the pressure differential operated motor of my invention;

Figure 6 is a view, partly in section and taken on the line 6—6 of Figure 7, disclosing details of the air transmitting ducts constituting part of the motor unit disclosed in Figures 5 and 7;

Figure 7 is a view, largely in section and taken on the line 7—7 of Figure 6, disclosing details of the solenoid operated valves for controlling the operation of the motor unit in Figure 5;

Figure 12 is a view, similar to Figure 2, disclosing a modified form of electrical hook-up of my invention;

Figures 1, 2:
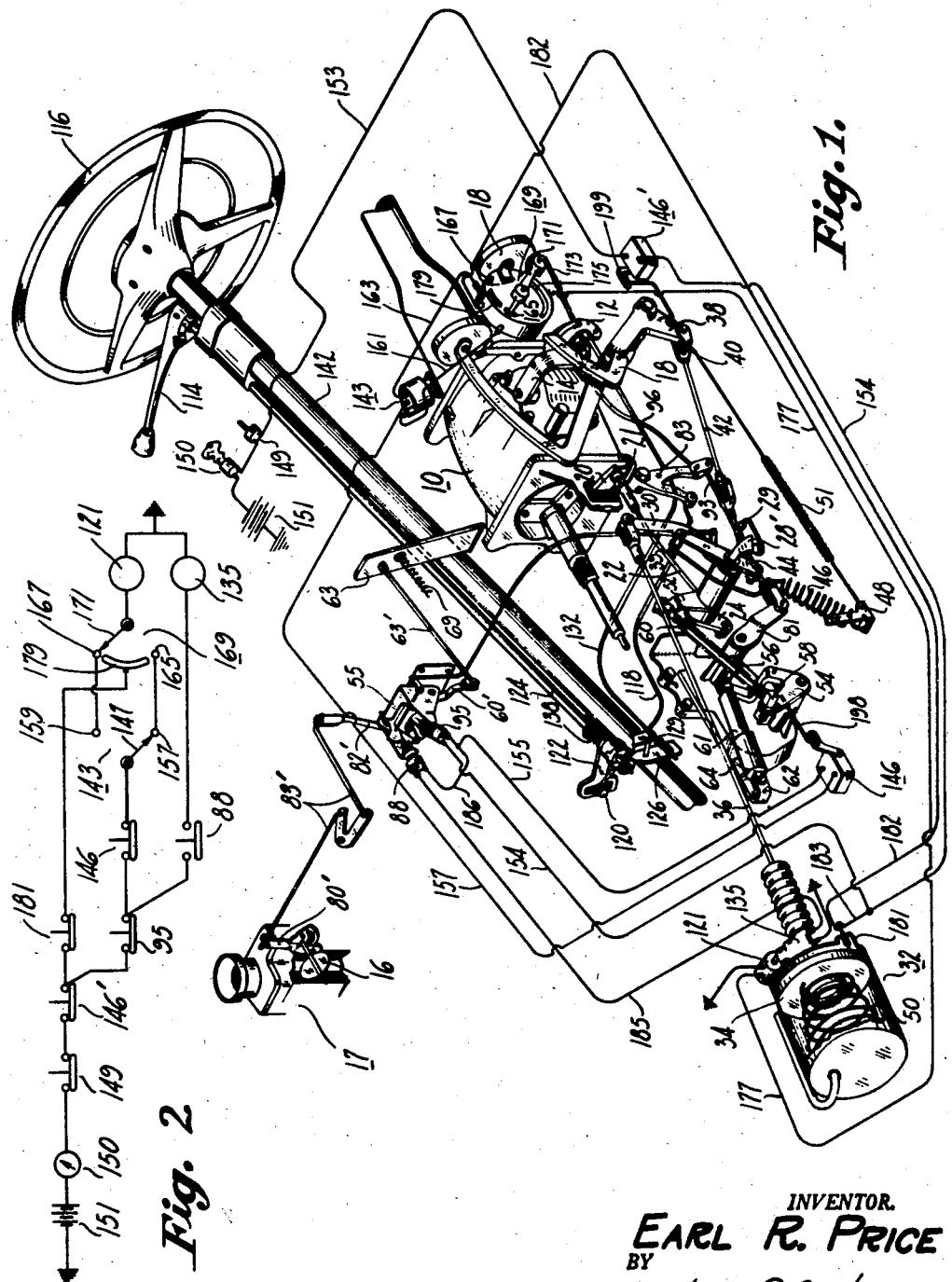
Figure 1 is a diagrammatic view of my invention disclosing the principal features thereof.
Figure 2 is a wiring diagram of the electrical mechanism disclosed in Figure 1.

Referring now to Figure 1 disclosing a preferred embodiment of my invention, a three speeds forward and reverse transmission 10 is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

My invention has to do with the manually and power operated means for actuating the aforementioned transmission operating cranks 12 and 14, for operating the engine throttle 16 of the carburetor 17, and for operating a conventional friction clutch, not shown, said clutch preferably including the usual driving and driven plates forced into engagement by clutch springs. The aforementioned transmission and the clutch as well as the hereinafter referred to fluid coupling are of conventional design; accordingly, no claim is made thereto and the same are not disclosed in the drawings. The mechanism of my invention also preferably includes, in the power plant of the vehicle, a fluid coupling such for example as that which is incorporated in several 1946 passenger vehicles and said coupling preferably includes an impeller and a vaned rotor the latter serving to drive the aforementioned driving plate of the clutch.

The friction clutch, not shown, is operably connected to the clutch pedal 18 of the car by means including a crank 20 and a rod 22 pivotally connected to one end of the crank 20 at 21 and pivotally connected at its other end to a crank 24. As disclosed in Figure 15 the crank 24 is fixedly secured to one end of a cylindrically shaped shaft 26; and a cylindrically shaped shaft 27 is sleeved over the shaft 26. The latter shaft is rotatably mounted on a spindle 31 extending from the end of a support 28' which is fixedly secured in place by bolts 29. A crank 30 is fixedly connected at its lower end to one end of the shaft 27 and is pivotally connected at its upper end at 37 to one end of a rod 36; and the latter rod is connected at one of its ends to a piston 34 of a pressure differential operated motor 32.

Completing the description of the connection between the clutch pedal 18 and the clutch, a lower arm 38 of said pedal is connected, by a lost motion connection 40, to a rod 42; and the latter rod is fixedly connected to the lower arm of a two-armed crank 44 which is fixedly connected to the shaft 26. To a pin 39 extending laterally from the upper end of the crank 44 there is connected one end of an over-center spring 46 the lower end of which is connected to a bracket 48; and a clutch pedal return spring 51 is connected at one end to the bracket 48 and at its other end to the lower end of the arm 38 of the clutch pedal.

There is thus provided manually and power operated means for operating the clutch, the clutch pedal 18, by virtue of the operation of the lost motion connection 40, remaining stationary when the motor 32 is energized to disengage the clutch and the motor piston 34 remaining stationary when the clutch is disengaged by a manual operation of the clutch pedal. The latter operation is effected by virtue of the lost motion connection between the pin 39 and the crank 30.

Figures 14, 15:
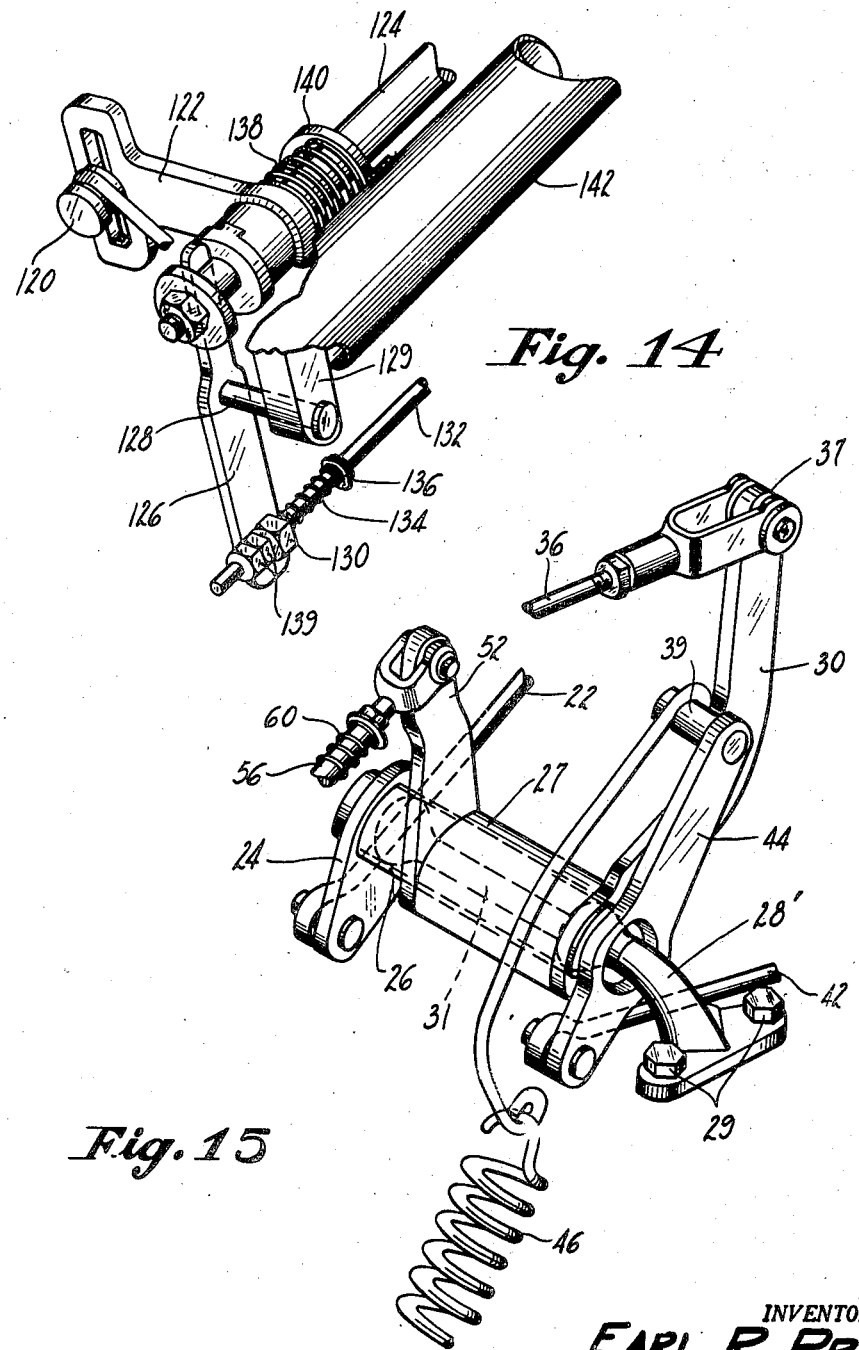
Figure 14 is a view disclosing details of the transmission operating force transmitting linkage located at the base of the steering column.
Figure 15 is a view disclosing details of a part of the linkage interconnecting the clutch pedal, the clutch, and the pressure differential motor.

Describing now the connection between the motor 32 and the transmission operated crank 14, as is described above, the piston operated rod 36 is connected to the crank 30; and the latter, when rotated, serves to rotate the shaft 27. A crank 52, Figure 15, is fixedly secured to the shaft 27 and said crank is yieldingly connected to one arm of a two-armed crank 54 by means including a two-diametered rod 56 pivotally connected at one of its ends by a yoke member to the upper end of the crank 52 and at its other end slidable through a trunnion block 58 pivotally mounted on the aforementioned arm of the crank 54; and a spring 60, sleeved over the rod 56 and positioned between the block 58 and the aforementioned yoke member, is compressed when the crank 52 is rotated counterclockwise, Figures 1 and 15, in the operation of the motor 32 in disengaging the clutch and operating the transmission. To the other arm of the two-armed crank 54 there is pivotally connected a dashpot 61 the stationary part of which is connected to the chassis of the vehicle by a bracket 62.

Figure 8:
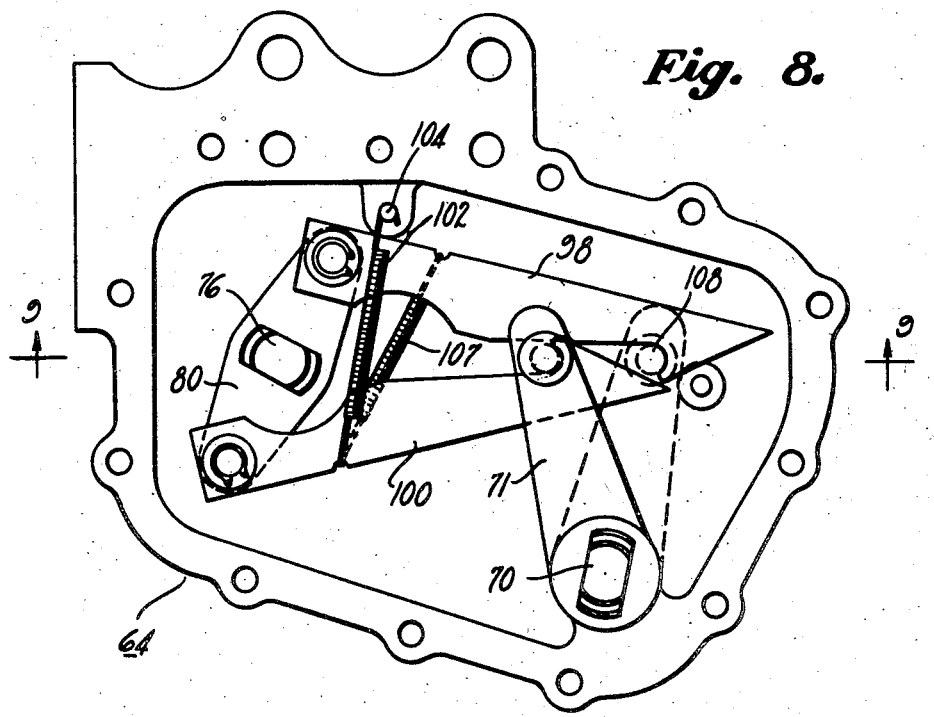
Figure 8 is a view disclosing details of the alternator mechanism of my invention.
Figure 9:
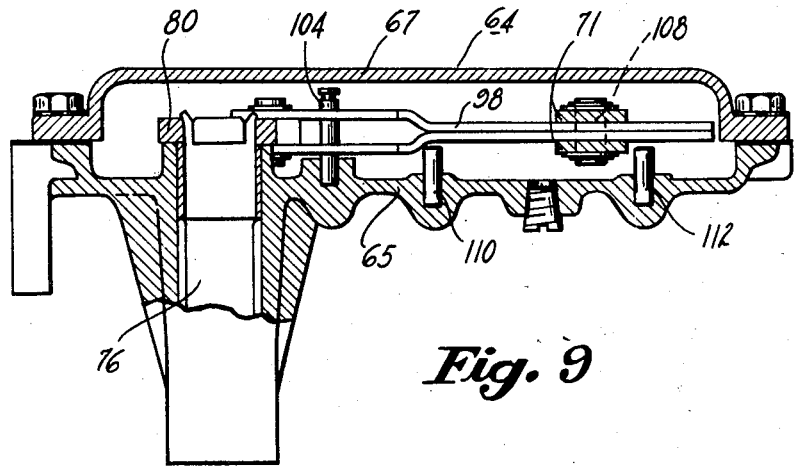
Figure 9 is a sectional view, taken on the line 9—9 of Figure 8, disclosing details of the alternator mechanism.

The two-armed crank 54 constitutes a part of an alternator 64, that is direction changing mechanism, said mechanism being disclosed in detail in Figures 8 and 9. The alternator mechanism includes casing parts 65 and 67 the latter being preferably fixedly secured to a part of the chassis of the car. The lever 54 is secured to a shaft 70, Figure 8, journalled in the casing part 65; and to the inner end of said shaft there is secured a two-part crank 71. The crank 71, together with the two-armed crank 54 constitutes an input lever member of the alternator mechanism. As disclosed in Figure 9, there is journalled in the casing part 65 a shaft 76 and to one end of said shaft within the alternator unit there is secured a two-armed crank 80. To the outer end of the shaft 76 there is secured a crank 81, Figure 1, said crank, together with the crank 80, constituting an output lever member of the alternator unit. The crank 81 is connected to the transmission operating crank 14 by means including a two-armed idler lever 83 mounted on the chassis. One arm of the idler lever 83 is pivotally connected to the lower end of the crank 81 by a rod 93, and said arm is connected to the crank 14 by a rod 96.

Completing the description of the alternator mechanism, to the upper arm of the two-armed crank 80 there is pivotally connected a two-part high gear leg member 98 having a claw-shaped outer end; and to the lower arm of the crank 80 there is pivotally connected a two-part second gear leg member 100 which is also shaped to provide a claw member at its outer end. A spring 102, secured at one of its ends to the leg 100 and at its other end to a pin 104, serves to bias said leg upwardly, Figure 8, to insure a completion of the power operated second gear setting of the transmission once initiated; and a spring 107, connected at its ends to the two legs 98 and 100, serves to bias said legs toward each other. A pin 108, interconnecting the upper ends of the two parts of the crank 71, is adapted to nest within one or the other of the recesses in the claw-shaped ends of the legs 98 and 100; accordingly, when the crank 71 is power operated in a clockwise direction, Figure 8, one or the other of the legs 98 and 100 is bodily moved to the right as a tension member to rotate the crank 14 to operate the transmission 10. As will be explained in greater detail hereinafter, when the motor 32 is de-energized a return spring 50 therein aided by the over-center spring 46 and the springs of the friction clutch, not shown, operates to move the alternator crank 72 counterclockwise, Figure 8, to the full line position disclosed in said figure; and in this position the alternator mechanism is prepared, that is preselected, for a subsequent operation to actuate one or the other of the legs 98 and 100. Stops 110 and 112, Figure 9, mounted in the casing part 65, serve to limit the angular movement of the input crank 71.

There is thus provided, by the alternator 64, a mechanism for effecting a reciprocatory angular movement of the transmission operating crank 14 to alternately establish the transmission in its second and high gear settings this operation being effected by an operation of the motor 32. This alternator mechanism is not claimed in this application inasmuch as the same constitutes the invention of my application Serial No. 755,299, filed June 18, 1947, now Patent No. 2,554,312, dated May 22, 1951.

Describing now the manually operated means for operating the crank 14, a gearshift lever 114, mounted beneath the steering wheel 116 of the car, is operably connected to one of the arms of the idler lever 83 by means including a rod 118. One end of the rod 118 is adjustably connected, by means including a bolt 120, Figure 14, to a crank arm 122 fixedly secured to a shaft 124. As disclosed in Figure 14, a lever 126, pivotally mounted on a pin 128, is connected at its upper end to the lower end of the shaft 124; and said pin is preferably mounted in a bracket 129. A trunnion block 130, extending laterally from and fixedly secured to one of the arms of the lever 126, is provided with an opening to receive one end of a rod 132; and a spring 134, sleeved over the rod 132 and positioned between the block 130 and a flange 136 fixed to the rod 132, provides a yieldable connection between the lever 126 and the cross-shift operating crank 12 of the transmission mechanism. The gearshift lever 114 is so connected to the shaft 124 that angular movement of said lever in a plane perpendicular to the plane of the steering wheel serves to bodily move said shaft upwardly against the tension of a cross shift return spring 138; and angular movement of the shift lever in a plane parallel to the plane of the steering wheel serves to rotate the shaft 124 about its axis to effect an angular movement of the crank 122. The latter movement serves to move the rod 118 to establish the transmission in gear.

The upward, that is cross-shift movement of the shaft 124 serves to rotate the lever 126 in a clockwise direction, Figure 14, and in this operation the trunnion block 130 abuts a nut 139 threadedly mounted on the end of the rod 132. The latter rod is thus moved to effect what is known as the cross-shift, that is, rail selecting operation of the transmission. Should the driver release the shift lever 114 after having completed this cross-shift operation then the spring 138, which is stronger than the spring 134, serves to return the lever 126 to its former position. In this operation the rod 132 remains in its cross-shift position and the spring 134 is compressed. The spring 138 is positioned between the hub of the crank 122 and a flange 140 the latter being fixedly secured to the steering column 142.

There is thus provided means for effecting a manual operation of the transmission; however it is to be noted that no claim is made to the force transmitting means disclosed in Figure 14 said means serving to interconnect the shift lever 114 with the transmission operating means 118 and 132. This particular mechanism is standard equipment of certain of the 1946 cars of the day.

Figure 4:
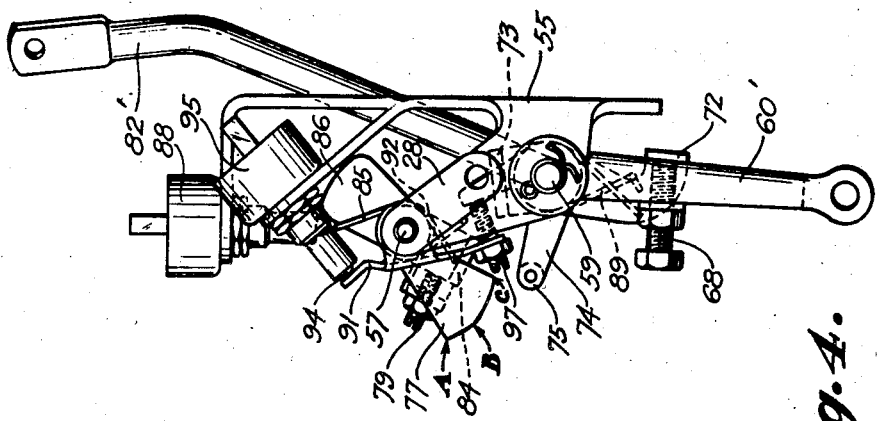
Figure 4 is a side view of the mechanism disclosed in Figure 3.
Figure 3:
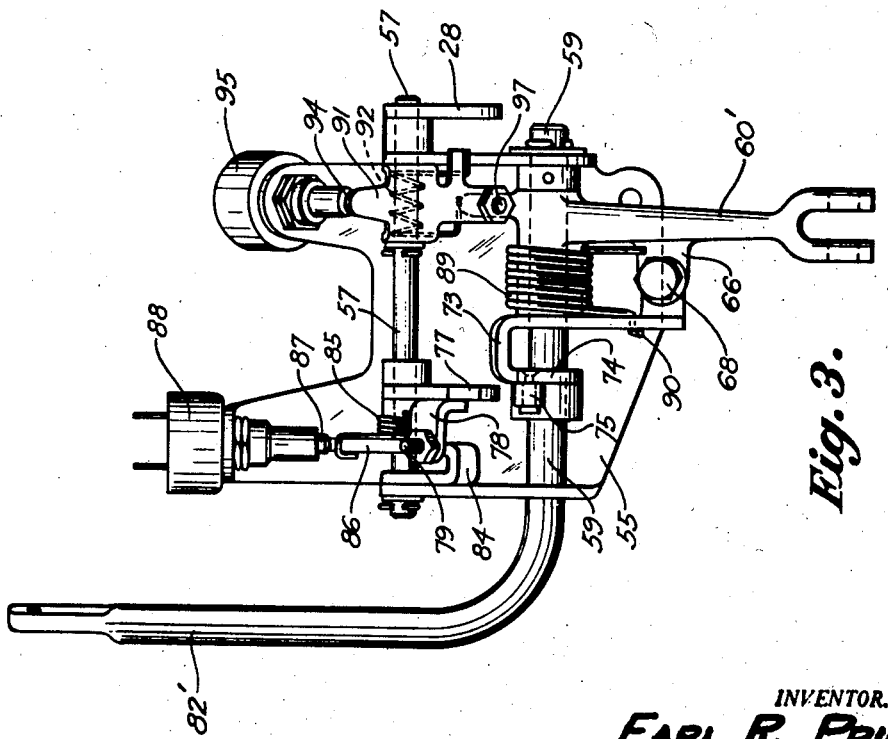
Figure 3 is a front view disclosing details of a part of the motor operated controls and also disclosing the accelerator operated switch of my invention.

Referring now to Figures 3 and 4 there are disclosed therein details of certain other controls of the mechanism disclosed in Figure 1. A support member 55 serves as a mounting for a shaft 57 and a shaft 59 said shafts being journalled in the sides of said support member. The shaft 59 is operably connected to the throttle valve 16 by cranks 80' and 82' and linkage 83'. A two-armed crank 60', rotatably mounted on the shaft 59 and operably connected to the accelerator 63 of the car by a link 63', is provided with a laterally extending flange 66 within which is adjustably mounted a stop member 68. This stop member is biased, by the operation of an accelerator return spring 69, into engagement with a flange member 72 extending laterally from a U-shaped fitting 73 fixedly secured to the shaft 59. From the fitting 73 there extends a flange 74 which is provided at its end with a roller member 75. This roller member is contacted by a cam 77 which is fixedly mounted on the shaft 57; and mounted alongside the cam 77 there is provided a support 78 which is also fixedly mounted on the shaft 57. There is adjustably mounted in the support 78 a set screw 79 adapted at its inner end to contact a U-shaped member 84 which is rotatably mounted on the shaft 57 and which is biased clockwise into engagement with the set screw 79 by a spring 85. A cam 86, secured to the member 84, contacts a pin 87 extending from the movable contact, not shown, of a breaker switch 88; and this contact is biased, by a spring, not shown, to its switch open position and is moved to its switch closed position by the spring operated cam 86 which is shaped to effect a closing of the switch during a part of the clutch engaging movement of the motor piston 34.

There is provided, by the switch 88 and the cam means for operating the same, means for controlling the operation of a choke valve operating solenoid 135, Figure 7, to effect a controlled clutch engaging operation of the motor 32. The parts, including the contour of the face of the cam 86, are preferably so constructed and arranged and so operative that the solenoid 135 is energized, to move a choke valve 131 away from a seat 137, during the clutch engaging movement of the piston 34 said operation being effected just as the piston reaches the point of clutch plate contact; and as stated above the parts are also so constructed and arranged and so operative that the switch 88 is subsequently opened, to effect a de-energization of the solenoid 135, during said clutch engaging movement of said piston. When the valve 131 is moved off a seat 139, Figure 7, air rushes into the motor 32, via an opening 105, at a relatively high rate to thereby effect a relatively rapid clutch engaging movement of the clutch driven plate; and when the valve 131 is seated, as is disclosed in Figure 7, air flows into the motor 32 via a relatively small opening 10'. The solenoid 135 and valve means for controlling the operation of the motor 32, are described in greater detail hereinafter.

Continuing the description of the mechanism disclosed in Figure 3, a coil spring 89, sleeved over the hub of the crank 60, is connected at one of its ends 90 to the member 73 and the other end of said spring abuts the outer face of the flange 66 on said crank. There is thus provided by the spring 89 and cooperating parts including the cam 77, means, interconnecting the accelerator and throttle whereby the accelerator may be depressed without effecting an opening of the throttle when the motor 32 is energized to successively disengage the clutch and operate the transmission; for with the first increment of clutch disengaging movement of the piston 34, the cam 77 is rotated counterclockwise, Figure 4, thereby providing, by its end portion A, B a stop to prevent a clockwise rotation, that is, throttle opening movement, of the accelerator operated flange 74. It is to be noted at this juncture that when the accelerator is depressed to cock the spring 89 and the motor 32 is de-energized to effect a re-engagement of the clutch, the cam 77 is rotated clockwise, Figure 4, to effect a controlled opening of the throttle as the clutch plates move into contact with each other, a segment B, C of said cam being shaped to effect this operation. Preferably all points along the segment A, B of the cam 77 are equally distant from the center of rotation of said cam; and the radius of the cam from the point B to the point C progressively decreases. There is thus provided, by the operation of the sector A, B of the cam 77, a stop means operative to prevent an opening of the throttle when the clutch is being disengaged and during the engagement of the clutch as the driven clutch plate moves up to a point just short of engagement with the driving clutch plate; and the subsequent operation of the segment B, C of said cam serves to make possible a progressively increased opening of the throttle, by the operation of the accelerator loaded spring 89, as the clutch plates move into driving engagement with each other.

Completing the description of the mechanism of Figure 3 a switch operating member 91, rotatably mounted on the shaft 57, is biased, by a coil spring 92, to rotate in a counterclockwise direction, Figure 4; and the lower end of the member 91 is adjustably connected to the upper arm of the two-armed crank 60 by means of a set screw 97 which is adjustably mounted on the member 91. The upper end of the switch operating member 91 abuts the lower end of a pin 94 which is connected to the movable contact of a breaker switch 95. The breaker switches 88 and 95 are of standard construction; accordingly the same are not disclosed in detail. Both of these switches preferably include a movable contact and a fixed contact, the movable contact being biased to its switch open position by a spring within the switch; and in the case of the accelerator operated switch 95 this spring is overcome, to close said switch, by the operation of the accelerator return spring 69. In other words the switch 95 is closed when the driver removes his foot from the accelerator to close the throttle.

The valve means for controlling the operation of the motor 32 is disclosed in detail in Figure 7 and includes a three way valve unit 99 and the aforementioned choke valve indicated as a whole by the reference numbered 101. Both units are housed within a casing 103 preferably mounted on the casing of the motor 32. The casing 103 is provided with the aforementioned port 105 to provide a vent to the atmosphere, at 106 to receive a duct 109 leading to the intake manifold of the internal combustion engine of the vehicle, and at 113 to receive a conduit 115 leading to a control compartment 111 of the motor. The three way valve unit 99 includes a valve member 117 operably connected to the armature 119 of a grounded solenoid 121 which is secured to the casing 103. When the solenoid 121 is energized the valve member 117 is moved downwardly, Figure 7, to leave a seat 123 and abut a seat 125; and when said solenoid is de-energized a spring 127 serves to return the valve member to its seat 123. The choke valve unit 101 includes the aforementioned valve member 131 which is operably connected to the armature 133 of a solenoid 135 secured to the valve casing 103. As previously briefly described, when the solenoid 135 is energized the valve member 131 is moved off a seat 137 onto a seat 139; and when the solenoid 135 is de-energized a spring 141 serves to return the valve member 131 to its seat 137.

Figure 13:
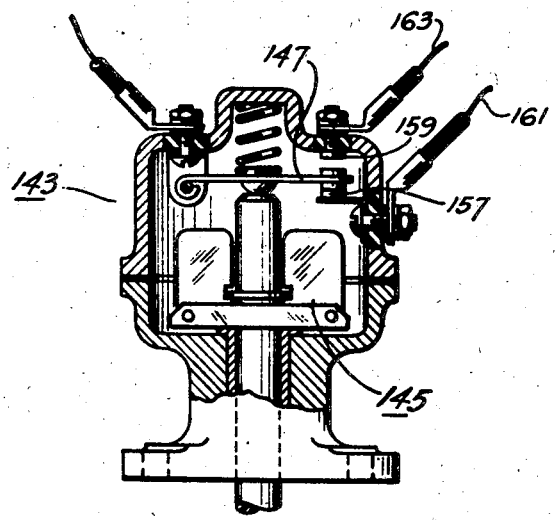
Figure 13 is a sectional view disclosing details of the governor operated switch mechanism of my invention.

The electrical means for controlling the operation of the solenoids 121 and 135 constitutes the most important feature of my invention, said electrical means being disclosed in Figure 2. Describing this control means the movable contact 147 of a single pole double throw switch 143, Figure 13, operated by a vehicle speed responsive centrifugally operated governor 145, is electrically connected in series with a breaker switch 146 actuated by the input lever 54 of the alternator 64, the aforementioned accelerator operated switch 95, a clutch pedal operated breaker switch 146' which is a duplicate of the switch 146, a dash mounted cut-out switch 149, the ignition switch 150 of the car, and a grounded battery 151. A switch 147, 157 of the switch 143 is closed, to effect a low gear operation of the transmission, when the vehicle is at a standstill or is traveling below a certain speed; and a switch 147, 159 is closed, to effect a high gear setting of the transmission, when the vehicle is traveling at or above the aforementioned speed, that is above governor speed.

Referring to Figure 1, the wiring interconnecting the aforementioned switches and battery preferably includes a conductor interconnecting the battery 151 with the ignition switch 150, a conductor 153 interconnecting the cut out switch 149 with the switch 146' a conductor 154 interconnecting the latter switch with the accelerator operated switch 95, a conductor 155 interconnecting the latter switch with the switch 146, and a conductor 157 interconnecting the latter switch with the movable contact 147 of the governor operated switch 143. The fixed contacts 157 and 159 of the latter switch are connected respectively, by wires 161 and 163, to fixed contacts 165 and 167 of a selector switch mechanism 169 operated by the motor 32. To one end of the movable contact 171 of the switch mechanism 169 there is pivotally connected a link 173 which is pivotally connected to the motor operated transmission operating crank 14, Figure 1. The movable contact 171 is electrically connected to the grounded solenoid 121 by a contact 175 and a conductor 177. A fixed contact 179 of the switch mechanism 169 is electrically connected to a motor operated breaker switch 181 by a conductor 182; and the latter switch is electrically connected to the clutch pedal operator switch 146' by a conductor 183 and a part of the conductor 154.

Contacts 165 and 171, contacts 171 and 179 and contacts 167 and 171 of the selector switch mechanism 169, providing three separate switches two of which are in series of the governor operated switch 143 and the third, that is, the switch 171, 179, being in series with the switch 181; and the movable contact 171 is so connected with the transmission operating crank 14, and said switch mechanism is so constructed, that the switch 167, 171 is closed when the transmission is established in its second gear setting, the switch 165, 171 is closed when the transmission is established in its high gear setting, and the switch 171, 179 is at all times closed except when the transmission is completely or substantially completely established in either its second gear setting or its high gear setting. The breaker switch 181 is actuated by the piston 34 of the motor 32 and is made at all times except when said piston is in its released that is clutch engaged position; the switch 146 is made when the alternator 64 is in its released that is pre-selecting position; and the clutch operated switch 146' is broken when the clutch pedal is completely or substantially completely depressed to disengage the clutch.

Referring to Figures 1 and 2 the grounded choke valve controlling solenoid 135 is wired to the motor operated clutch control switch 88 by a conductor 185 and said switch is electrically connected, by a conductor 186, to the conductor 155, that is, to a point in the electrical circuit lying between the accelerator switch 95 and the governor operated switch 146; and with such a construction the clutch engaging control operation of the motor 32 is disabled when the accelerator is depressed to open the switch 95.

Figure 10:
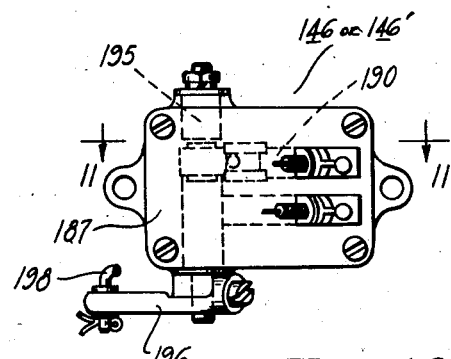
Figure 10 is a plan view of the alternator and clutch pedal operated breaker switch of my invention.
Figure 11:
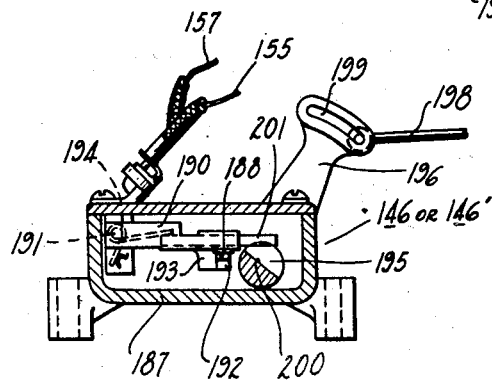
Figure 11 is a sectional view, taken on the line 11—11 of Figure 10 disclosing details of the breaker switch of said figure.

Completing the description of the electrical control means of my invention there are disclosed, in Figures 10 and 11, details of the alternator operated switch 146 and the clutch pedal operated switch 146' the two switches and the force transmitting linkage for operating said switches being identical in construction and operation. The description given below will refer to the switch 146. The latter switch mechanism includes a two part casing 187 which houses a movable contact member 188 mounted upon a support member 190 of electrically conductive material said support being pivotally mounted at 191 upon said casing. The casing 187 also houses a fixed contact 192 mounted upon a support 193 of electrically conductive material said support also being secured to said casing. The support 193 is connected, by the electrical conductor 155, to the solenoid 95; and the support 190 is connected, by the conductor 157, to the switch 143. The movable contact 188 is biased into abutment with the fixed contact 192 by a spring 194 acting upon the support 190; and to separate said contacts, that is open the switch mechanism 146, there is provided a cam shaft 195 journalled in the casing 187 and rotated by a crank 196 secured to one end of said shaft.

Describing the operation of the switch 146 when the alternator input lever 54 is in its released position, that is, the position disclosed in full lines in Figure 11, a link 198, secured to the lever 54 rests within the lower end of a slot 199 in the crank 196; all as is disclosed in Figure 11. At this time the switch contacts 188 and 192 are in abutment, that is, the switch 146 is closed. When the motor 32 is vacuum energized the piston 34 rotates the lever 54 clockwise, Figure 8, counterclockwise, Figure 1, and during the first increment of this clutch disengaging movement of the piston the end of the link 198 is moved to the left; Figure 11, to take up the lost motion provided by the slot 199; and it is to be noted that the switch 146 remains closed during this movement. Continued clutch disengaging movement of the piston 34 then results in a counter-clockwise rotation of the crank 196, Figure 11, and cam shaft 195 connected thereto; and this operation serves to take up the lost motion between the right end of a flat 200 on said shaft and the bottom of a member 201 of insulating material secured to the movable support member 190. Continued clutch disengaging and transmission operating movement of the piston 34 then serves to continue the counter-clockwise rotation of the cam shaft 195 to open the switch 146 this operation being effected just as the transmission is being established in gear.

Describing the reverse operation of the switch 146, that is, the operation when the spring 50 of the motor 32 moves the piston to the right, Figure 1, to engage the clutch and operate the alternator 64, the first increment of movement of said piston serves to move the link 198 to the right, Figure 11, to take up the lost motion provided by the slot 199; and the switch 146 of course remains open during this operation. Continued clutch engaging movement of the piston 34 serves to rotate the crank 196 clockwise, Figure 11, the switch 146 remaining open during this operation; and continued clockwise rotation of said crank, by the clutch engagement movement of said piston, serves to return the parts of the switch mechanism to the switch closed position that is to the relative positions disclosed in Figure 11.

Describing now the complete operation of the mechanism of my invention and incidentally completing the description of the parts of said mechanism not heretofore described, it will be assumed that the vehicle is at a standstill and that the engine is idling; and under these conditions the transmission will be established in its second gear setting. Explaining the operation of the mechanism to effect this setting, the switches 149, 150, 146, 95, 146', the switch 165, 171, and the governor operated switch 147, 157 are closed as the vehicle is being decelerated to a stop, accordingly the solenoid 121 is energized to open the valve 117; and this results in an energization of the motor 32 to effect the second gear setting of the transmission, the electrical circuit including said switches being automatically opened, by the opening of the switches 171, 179 and 146, at the time the setting of the transmission is effected.

Explaining this operation in greater detail it is to be remembered that the selector switch 165, 171 is closed when the transmission is established in its high gear setting this operation being effected to prepare the mechanism for a low gear setting of the mechanism; and it is also to be remembered that the alternator operated switch 146 is closed prior to an operation of the motor 32, and that the governor switch 147, 157 is automatically closed, to initiate the second gear operation of the mechanism, when the speed of the vehicle is brought down to a certain factor.

With the opening of the latter circuit the piston 34 returns to its clutch engaged, that is, released position; and with this operation the switch 181 is opened, the switches 146 and 167, 171 are closed, and the crank 71 of the alternator is returned to its preselecting position disclosed in full lines in Figure 8. The mechanism is then prepared for a subsequent power operated high gear operation of the transmission. As to above described second gear operation of the mechanism, it is to be remembered that the clutch is operated to facilitate the operation of the transmission; and the throttle is held closed during said operation.

The transmission being established in its second gear setting, the driver, to get the vehicle under way, will then depress the accelerator; and this operation in getting the vehicle underway in second gear is facilitated by the operation of the fluid coupling of the power plant. When the speed of the vehicle exceeds governor speed the switch 147, 159 will be automatically closed and then when the accelerator is released to close the switch 95 there will be effected another energization of the motor 32 to successively effect a disengagement of the clutch and a high gear setting of the transmission. In this operation the throttle is again held closed by the cam 77 to facilitate the operation of the mechanism.

As the high gear setting of the transmission is being completed the switches 146 and 171, 179 are opened thereby again initiating the return of the piston 34 to its released position; and it is to be remembered that during the high gear operation of the mechanism should the driver suddenly decelerate the car sufficiently to close the switch 147, 157 then after the high gear operation of the transmission is completed, and assuming the accelerator operated switch 95 to remain closed, the mechanism will be automatically operated to establish the transmission in its second gear setting. This operation is made possible by the operation of the switch 146.

Assuming that the clutch pedal is not depressed to open the switch 146', the transmission will then be shuttled back and forth between its second and high gear settings depending upon the speed of the vehicle, the throttle and clutch being operated to facilitate these power operations of the mechanism.

In this shuttling operation one or the other of the motor operation selector switches 167, 171 and 165, 171 is made just as the transmission is being established in gear thereby preparing the mechanism for a subsequent operation of the transmission; and said operation is then initiated by the operation of the governor switch 143.

Should the driver at any time desire to overrule the automatic power operation of the mechanism he need but press the clutch pedal sufficiently to open the switch 146' thereby disabling the power means. Duplicating the operation of the alternator operation switch 146, the switch 146' is closed by the depression of the clutch pedal only during the last increment of the depressing operation. A manual operation of the shift lever 114 then serves to establish the transmission in the desired setting, first one and then the other of the alternator legs 100 and 98 being moved to successively establish the transmission in its second and high gear settings or in its second and low gear settings. The transmission may also be successively manually operated between its reverse gear setting and one or the other of the low and high gear settings.

Reviewing other features of my invention the operation of the switch 171, 179 serves to insure the clutch disengaging and transmission operating operation of the motor 32 once initiated and despite an opening of the accelerator operated switch 95 during said operation; the motor operated switch 181 serves to open the electrical circuit including the switch 171, 179 when the operation of the transmission is completed thereby preventing an undesired power operation of the transmission should the same slip out of gear and close the latter switch; the dash mounted cut-out switch 149 may be opened at will thereby disabling the power means of the invention; the alternator operated switch 146 serves to insure a recycle second gear operation of the transmission if this operation is called for by the governor operated switch 143; and the construction and operation of the clutch operated switch 146', including a lost motion connection 199' duplicating the connection 198, 199, is such that the operation of the motor 32, to effect the operation of the transmission and clutch, is completed prior to the opening of said switch.

There is thus provided a simple, compact and easily serviced combined manually and power operated mechanism for operating a three speeds forward and reverse transmission of an automotive vehicle. The selector switch mechanism 169, including the selector switches 167, 179 and 165, 179 and the series connected governor operated switch 143, cooperate to effect a control of the vacuum motor 32 to shuttle the transmission back and forth between its second and high gear settings the clutch being disengaged to facilitate this operation of the transmission and reengaged, by a stage operation thereof, provided the accelerator remains closed to maintain the switch 95 closed. If the accelerator is depressed during the cycle of operation of the mechanism said operation does not open the throttle to race the engine; and the cam 77 then serves to control the opening of the throttle as the clutch is being engaged. However, one of the most important features of my invention lies in the fact that the driver may, simply by depressing the clutch pedal sufficiently to open the switch 146', overrule, that is disable, the power means of the mechanism of my invention; and having so overruled the power means he may then operate the transmission in the conventional manner, that is, he may establish the transmission in any one of its settings by the usual operation of the shift lever 114.

There is disclosed in Figure 12 another embodiment of my invention differing from that previously described only in the clutch pedal controlled means for disabling the power means to thereby make possible a manual operation of the transmission; accordingly the parts of the mechanism of Figure 12 which are duplicates of certain parts of the mechanism of Figure 2 are given the reference numerals of the latter figure. Describing now the essence of the mechanism of Figure 12, a hold-down relay mechanism 202 is incorporated in the electrical connection between the selector switch mechanism 169 and the three way valve controlling solenoid 121. This relay mechanism includes a grounded coil 206 wired to the clutch pedal operated switch 146' said coil, when energized as a result of a closing of the latter switch, serving to open a normally closed switch 208 and close a normally open switch 210. There is thus provided, in the clutch pedal controlled hold-down relay mechanism 202, electrical means for disabling the transmission operating power means when the clutch pedal is depressed to close the switch 146'; and this relay also renders the mechanism of my invention operative to hold the transmission in its second gear setting after a manually operated downshift to second above governor speed, until the switch 95 is opened by a throttle opening depression of the accelerator.

Although only two embodiments of the invention have been illustrated and described, various changes in the form and relative arrangements of the parts may be made to suit requirements.

I claim:

1. Manually and power operated control means adapted to control the operation of the three speeds forward and reverse transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, the throttle being held closed during the disengagement of the clutch, valve means for controlling the operation of said motor, and electrical means for controlling the operation of the valve means to successively effect an energization of the motor and a de-energization thereof, said electrical means including a clutch pedal operated switch, an accelerator operated switch, a governor operated single pole double throw switch, electrical means interconnecting the movable contact of the latter switch and the aforementioned two switches to provide a series connection of said three switches, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a valve controlling grounded solenoid, and electrical means interconnecting said solenoid with the movable contact of the motor operated switch.

2. Manually and power operated control means adapted to control the operation of the three speeds forward and reverse transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, the throttle being held closed during the disengagement of the clutch, a three way valve for controlling the operation of said motor, and electrical means for controlling the operation of the valve means to successively effect an energization of the motor and a de-energization thereof, said electrical means including a clutch pedal operated switch which is closed when said pedal is in its released position and opened when said pedal is depressed a substantial amount, an accelerator operated switch which is closed when the accelerator is released, said switch being electrically connected in series with the clutch pedal operated switch, a governor operated single pole double throw switch having its movable contact electrically connected in series with the accelerator operated switch, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a grounded valve controlling solenoid, and electrical means interconnecting said solenoid with the movable contact of the motor operated switch.

3. Control means adapted to control the operation of the change speed transmission and friction clutch of the power plant of an automotive vehicle provided with a shift lever and a clutch pedal, said means comprising a single acting fluid pressure operated motor operably connected to the transmission and clutch and operable, when the motor is energized, to successively disengage the clutch and operate the transmission and to subsequently effect a re-engagement of the clutch when the motor is de-energized, force transmitting means, interconnecting the transmission, clutch and power element of the motor, force transmitting means interconnecting a portion of the aforementioned force transmitting means and the shift lever and operable to effect a manual operation of a part of the transmission, valve means for controlling the operation of said motor, and electrical means for controlling the operation of said valve means to effect a cycle of power operations of the mechanism to successively disengage the clutch, operate the transmission and re-engage the clutch, said electrical means including a clutch pedal operated switch operable to disable the electrical means when said pedal is substantially depressed and thereby make possible a manual operation of the transmission.

4. Control means adapted to control the operation of the change speed transmission and friction clutch of the power plant of an automotive vehicle provided with a shift lever and a clutch pedal, said means comprising a single acting fluid pressure operated motor operably connected to the transmission and clutch and operable, when the motor is energized, to successively disengage the clutch and operate the transmission and to subsequently effect a re-engagement of the clutch when the motor is de-energized, force transmitting means, including a direction changing mechanism interconnecting the transmission, clutch and power element of the motor, force transmitting means interconnecting a portion of the aforementioned force transmitting means and the shift lever and operable to effect a manual operation of a part of the transmission, a three way valve for controlling the operation of said motor, and electrical means for controlling the operation of said valve to effect a cycle of power operations of the mechanism to successively disengage the clutch, operate the transmission and re-engage the clutch, said electrical means including a clutch pedal operated switch operable to disable the electrical means when said pedal is substantially depressed and thereby make possible a manual operation of the transmission.

5. Manually and power operated control means adapted to control the operation of the transmission and the friction clutch of the power plant of an automotive vehicle including an accelerator and a clutch pedal, said means comprising a pressure differential operated motor operably connected to the transmission and clutch and operable to successively disengage the clutch, operate the transmission and re-engage the clutch, valve means for controlling the operation of said motor, and electrical means for controlling the operation of the valve means to successively effect an energization of the motor and a de-energization thereof, said electrical means including a clutch pedal operated switch which is closed when said pedal is in its released position and opened when said pedal is depressed a substantial amount, an accelerator operated switch which is closed when the accelerator is released said switch being electrically connected in series with the clutch pedal operated switch, a governor operated single pole double throw switch having its movable contact electrically connected in series with the accelerator operated switch, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means interconnecting the third fixed contact of the motor operated switch with the clutch pedal operated switch, a grounded valve controlling solenoid, and electrical means interconnecting said solenoid with the movable contact of the motor operated switch.

6. Manually and power operated control means adapted to control the operation of the transmission and the friction clutch of the power plant of an automotive vehicle including an accelerator and a clutch pedal, said means comprising a pressure differential operated motor operably connected to the transmission and clutch, and operable to successively disengage the clutch, operate the transmission and re-engage the clutch, valve means for controlling the operation of said motor, and electrical means for controlling the operation of the valve means to successively effect an energization of the motor and a de-energization thereof, said electrical means including a clutch pedal operated switch which is closed when said pedal is in its released position and opened when said pedal is depressed a substantial amount, an accelerator operated switch which is closed when the accelerator is released, said switch being electrically connected in series with the clutch pedal operated switch, a governor operated single pole double throw switch, having its movable contact electrically connected in series with the accelerator operated switch, a motor operated selector switch mechanism including three fixed contacts and a movable contact, electrical means interconnecting one of the fixed contacts with one of the fixed contacts of the governor operated switch, electrical means interconnecting a second of the three fixed contacts with another of the fixed contacts of the governor operated switch, electrical means including a normally closed motor operated switch which is broken when the power element of the motor is in its clutch engaged position said means serving to interconnect the third fixed contact of the motor operated switch with the clutch pedal operated switch, a grounded valve controlling solenoid, and electrical means interconnecting said solenoid with the movable contact of the motor operated switch.

EARL R. PRICE.

REFERENCES CITED

The following references are of record in the file of this patent:

UNITED STATES PATENTS

| Number | Name | Date |
| --- | --- | --- |
| 2,098,691 | Neff | Nov. 9, 1937 |
| 2,187,824 | Britton | Jan. 23, 1940 |
| 2,296,290 | Mayrath | Sept. 22, 1942 |
| 2,325,486 | Derungs | July 27, 1943 |
| 2,328,921 | Neff | Sept. 7, 1943 |
| 2,348,435 | Hey et al. | May 9, 1944 |
| 2,434,717 | Randol | Jan. 20, 1948 |
| 2,492,923 | Moore et al. | Dec. 27, 1949 |